United States Patent
Yamaguchi et al.

(10) Patent No.: US 6,686,047 B2
(45) Date of Patent: Feb. 3, 2004

(54) REACTIVE PARTICLES, CURABLE COMPOSITION COMPRISING THE SAME AND CURED PRODUCTS

(75) Inventors: Yoshikazu Yamaguchi, Ibaraki (JP); Takao Yashiro, Kawaguchi (JP); Isao Nishiwaki, Toride (JP); Takashi Ukachi, Kamlya (JP)

(73) Assignees: DSM N.V., Heerlen (NL); JSR Corporation, Tokyo (JP); Japan Fine Coatings Co. Ltd, Tokyo (JP)

( * ) Notice: Subject to any disclaimer, the term of this patent is extended or adjusted under 35 U.S.C. 154(b) by 0 days.

(21) Appl. No.: 10/183,028

(22) Filed: Jun. 27, 2002

(65) Prior Publication Data

US 2003/0099824 A1 May 29, 2003

Related U.S. Application Data

(63) Continuation of application No. PCT/NL00/00938, filed on Dec. 20, 2000.

(30) Foreign Application Priority Data

Dec. 28, 1999 (JP) .......................................... 11-375407

(51) Int. Cl.$^7$ ................................................. B32B 5/16
(52) U.S. Cl. ...................................................... 428/407
(58) Field of Search .......................................... 428/407

(56) References Cited

U.S. PATENT DOCUMENTS

| 3,441,466 | A |   | 4/1969  | Marsden et al.   |
|-----------|---|---|---------|------------------|
| 4,357,271 | A |   | 11/1982 | Rosenquist       |
| 4,482,656 | A |   | 11/1984 | Nguyen et al.    |
| 5,021,530 | A | * | 6/1991  | Yamamoto et al.  |
| 5,254,631 | A | * | 10/1993 | Yamamoto et al.  |
| 5,268,436 | A | * | 12/1993 | Huver et al.     |
| 5,888,290 | A | * | 3/1999  | Engle et al.     |
| 6,034,151 | A | * | 3/2000  | Moszner et al.   |
| 6,132,861 | A | * | 10/2000 | Kang et al.      |
| 6,465,541 | B2| * | 10/2002 | Bretscher et al. |

FOREIGN PATENT DOCUMENTS

| GB | 1 260 798 A | 1/1972 |
| GB | 1 342 787 A | 1/1974 |
| GB | 2 177 093 A | 1/1987 |
| WO | WO99 31190  | 6/1999 |

* cited by examiner

*Primary Examiner*—H. Thi Le
(74) *Attorney, Agent, or Firm*—Pillsbury Winthrop LLP

(57) ABSTRACT

Reactive particles have been invented that may be used for a curable composition exhibiting excellent cured product productivity and capable of forming coatings with high hardness, superior scratch resistance, excellent abrasion resistance, low curling properties, superb adhesion, and chemicals resistance, particularly high chemicals resistance, on the surface of various substrates; a curable composition containing the reactive particles; and cured products made from the curable composition.

20 Claims, No Drawings

REACTIVE PARTICLES, CURABLE COMPOSITION COMPRISING THE SAME AND CURED PRODUCTS

This is a Continuation 1(b) International Application No. PCT/NL00/00938 filed Dec. 20, 2000, which designated the U.S.

FIELD OF THE INVENTION

The present invention relates to reactive particles, a composition comprising the reactive particles, and the cured products. More particularly, the present invention relates to reactive particles used for a resin composition exhibiting excellent curability (the characteristics of easily forming cured coatings in a short period of time) and capable of forming coatings with high hardness, superior scratch resistance, excellent abrasion resistance, low curling properties, and superb adhesion, particularly coatings with well balanced hardness and low curling properties, on the surface of various substrates such as, for example, plastics (polycarbonate, polymethacrylate, polystyrene, polyester, polyolefin, epoxy resins, melamine resins, triacetyl cellulose resins, ABS resins, AS resins, norbornene resins, etc.), metals, woods, papers, glasses, and slates, as well as a curable composition comprising the reactive particles, and the cured products made from the curable composition. The curable composition containing the reactive particles and the cured product of the present invention are suitable for use, for example, as a protective coating material to prevent stains or scratches on plastic optical parts, touch panels, film-type liquid crystal elements, plastic containers, or flooring materials, wall materials, and artificial marbles which are used for architectural interior finish; as an adhesive for various substrates, a sealing material, and a vehicle for printing ink; and the like.

PRIOR ART

In recent years, a curable composition exhibiting excellent capability of forming cured materials and forming coatings with all of the requirements such as excellent hardness, scratch resistance, abrasion resistance, low curling properties, adhesion, and transparency, resistance to chemicals, and appearance is desired as a protective coating material to prevent stains or scratches on the surface of various substrates, an adhesive for various substrates, a sealing material, or a vehicle for printing ink.

A number of compositions satisfying these requirements have been proposed. However, no compositions which satisfactorily satisfy all of the requirements such as excellent curability as a curable composition, and high hardness, superior scratch resistance, abrasion resistance, low curling properties, superb adhesion, and excellent transparency, and chemicals resistance when made into cured coatings have not been obtained.

For example, U.S. Pat. No. 3,451,838 and U.S. Pat. No. 2,404,357 propose the use of compositions comprising a hydrolyzate of alkoxysilane and colloidal silica as major components to be used as a heat-curable coating material. However, because these heat-curable coating materials are reacted at a high temperature after application to substrates, these materials exhibit problems such as softening or deformation (shrinkage, swelling, etc.) of the substrates and poor cured material productivity when used for the above-described plastic substrates.

Japanese Patent Publication No. 21815/1987 proposed a composition for a radiation curable coating material comprising acrylate and particles of colloidal silica of which the surface is modified by methacryloxy silane. This type of radiation curable compositions are used in a number of applications in recent years due to the excellent productivity cured materials. However, because the radiation curable compositions usually form cured coatings by radical polymerization, the cure degree in the neighborhood of the surface of coatings is not sufficient due to the effect of dissolved oxygen in the polymerization system. Appearance of cured coatings may change by chemicals such as organic solvents, acids, or alkalis. Thus, the coatings made from radiation curable compositions have a problem of poor chemicals resistance.

PROBLEMS TO BE SOLVED BY THE INVENTION

The present invention has been completed in view of the above-described problems and has an object of providing reactive particles used for a curable composition exhibiting excellent productivity of cured materials and capable of forming coatings with high hardness, scratch resistance, abrasion resistance, low curling properties, and adhesion, and chemicals resistance, especially excellent chemicals resistance, on the surface of various substrates, as well as the curable composition comprising the reactive particles, and the cured products made from the curable composition.

MEANS FOR SOLVING THE PROBLEMS

As a result of extensive studies to achieve the above object, the inventors of the present invention have found that cured coatings exhibiting well balanced characteristics, particularly exhibiting excellent chemicals resistance without impairing high hardness, superior scratch resistance, low curling properties, good abrasion resistance can be obtained from a curable composition comprising reactive particles prepared by bonding: (a) particles comprising at least one oxide of an element selected from the group consisting of silicon, aluminum, zirconium, titanium, zinc, germanium, indium, tin, antimony, and cerium, (b) a first organic compound (b1) having a radically polymerizable unsaturated group and a hydrolyzable group in the molecule, and a second organic compound (b2) containing cationically polymerizable group and a hydrolyzable group in the molecule

PREFERRED EMBODIMENT OF THE INVENTION

The reactive particles, the curable composition comprising the reactive particles, and the cured products thereof of the present invention will now be described in more detail.

I. Reactive Particles (A)

The reactive particles (A) of the present invention are prepared by bonding: (a) particles comprising at least one oxide of an element selected from the group consisting of silicon, aluminum, zirconium, titanium, zinc, germanium, indium, tin, antimony, and cerium (hereinafter called "oxide particles (a) or "component (a)"), (b) an organic compound (b1) having a radically polymerizable unsaturated group and a hydrolyzable group in the molecule (hereinafter called "first organic compound (b1)"), and an organic compound (b2) containing a hydrolyzable group and a group selected from the group consisting of an oxetane group, 3,4-epoxycyclohexyl group, and epoxy group in the molecule (hereinafter called "second organic compound (b2)") (hereinafter may be called "component (b)" or "modification component (b)").

1. Oxide Particles (a)

For obtaining colorless cured coatings from the curable composition, the oxide particles (a) used in the present invention should be particles of at least one oxide of an element selected from the group consisting of silicon, aluminum, zirconium, titanium, zinc, germanium, indium, tin, antimony, and cerium.

Examples of suitable oxides are silica, alumina, zirconia, titanium oxide, zinc oxide, germanium oxide, indium oxide, tin oxide, indium-tin oxide (ITO), antimony oxide, and cerium oxide. Preferably, silica, alumina, zirconia, and antimony oxide are applied from the viewpoint of high hardness. These compounds may be used either individually or in combination of two or more. In addition, oxide particles of these elements are preferably in the form of a powder or a solvent dispersion sol. When the oxide particles are in the form of a dispersion, an organic solvent is preferable as a dispersion medium from the viewpoint of mutual solubility with other components and dispersibility. Examples of organic solvents are alcohols such as for example methanol, ethanol, isopropanol, butanol, and octanol; ketones such as for example acetone, methyl ethyl ketone, methyl isobutyl ketone, and cyclohexanone; esters such as for example ethyl acetate, butyl acetate, ethyl lactate, and γ-butyrolactone, propylene glycol monomethyl ether acetate, and propylene glycol monoethyl ether acetate; ethers such as for example ethylene glycol monomethyl ether and diethylene glycol monobutyl ether; aromatic hydrocarbons such as for example benzene, toluene, and xylene; and amides such as for example dimethylformamide, dimethylacetamide, and N-methylpyrrolidone. Preferable organic solvents are choosen from the group consisting of methanol, isopropanol, butanol, methyl ethyl ketone, methyl isobutyl ketone, ethyl acetate, butyl acetate, toluene, and xylene.

The number average particle diameter of the oxide particles (a) is from 0.001 $\mu$m to 2 $\mu$m, preferably from 0.001 $\mu$m to 0.2 $\mu$m, and more preferably from 0.001 $\mu$m to 0.1 $\mu$m. If the number average particle diameter is more than 2 $\mu$m, transparency of the cured product and surface conditions of the coating tends to be impaired. Also, various surfactants and amines may be added to improve dispersibility of particles.

Examples of suitable colloidal silicon oxide particles are silica particles available under the trade names Methanol Silica Sol, IPA-ST, MEK-ST, NBA-ST, XBA-ST, DMAC-ST, ST-UP, ST-OUP, ST-20, ST-40, ST-C, ST-N, ST-O, ST-50, ST-OL, etc., manufactured by Nissan Chemical Industries, Ltd. Examples of powdery silica are products available under the trade names AEROSIL 130, AEROSIL 300, AEROSIL 380, AEROSIL TT600, and AEROSIL OX50 (manufactured by Japan Aerosil Co., Ltd.), Sildex H31, H32, H51, H52, H121, H122 (manufactured by Asahi Glass Co., Ltd.), E220A, E220 (manufactured by Nippon Silica Industrial Co., Ltd.), SYLYSIA470 (manufactured by Fuji Silycia Chemical Co., Ltd.) and SG Flake (manufactured by Nippon Sheet Glass Co., Ltd.).

Examples of commercially available dispersions of alumina are aquaous dispersions Alumina Sol-100, -200, -520 (trade names, manufactured by Nissan Chemical Industries, Ltd.); isopropanol dispersions of alumina, AS-150I (trade name, manufactured by Sumitomo Osaka Cement Co., Ltd.); and toluene dispersion of alumina, AS-150T (trade name, manufactured by Sumitomo Osaka Cement Co., Ltd.). An example of a toluene dispersion of zirconia is HXU-110 JC (trade name, manufactured by Sumitomo Osaka Cement Co., Ltd.). An example of an aqueous dispersion product of zinc antimonate powder is Celnax (trade name, manufactured by Nissan Chemical Industries, Ltd.). Examples of powders and solvent dispersion products of alumina, titanium oxide, tin oxide, indium oxide, zinc oxide are available under the name, Nano Tek, for example, (trade name, manufactured by C I Kasei Co., Ltd.). An example of an aqueous dispersion sol of antimony dope-tin oxide is SN-100D (trade name, manufactured by Ishihara Sangyo Kaisha, Ltd.). An example of an ITO powder is a product manufactured by Mitsubishi Material Co., Ltd.; and an example of an aqueous dispersion of cerium oxide is Needral (trade name, manufactured by Taki Chemical Co., Ltd.).

The shape of oxide particles (a) may be globular, hollow, porous, rod-like, plate-like, fibrous, or amorphous, with a globular shape being preferable. The specific surface area of oxide particles (a), determined by the BET method using nitrogen, is preferably in the range of 10 to 1000 $m^2/g$, and more preferably 100 to 500 $m^2/g$. These oxide particles (a) can be used either in the form of a dry powder or a dispersion in water or an organic solvent. For example, a dispersion liquid of fine particles of oxide known in the art as a solvent dispersion sol of these oxides can be used. Use of a solvent dispersion sol of oxide is particularly desirable in the application in which excellent transparency of cured products is required.

2. Modification Component (b)

The modification component (b) used in the present invention includes the first organic compound (b1) and the second organic compound (b2), both being independent compounds. The first organic compound (b1) and the second organic compound (b2) individually combine with and modify the oxide particles (a). An alternative embodiment of the present invention is a modification component (b) that contains a hdyrolyzable group, a radically polymerizable unsaturated group and a cationally polymerizable group in one molecule.

(1) First Organic Compound (b1)

The first organic compound (b1) used in the present invention is a compound having a radically polymerizable unsaturated group and a hydrolyzable group in the molecule, and preferably an organic compound comprising the group [—X—C (=Y)—NH—] shown by the group shown by the following formula (5).

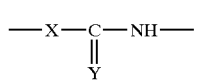

(5)

wherein

X represents oxygen or sulfur; and

Y represents oxygen or sulfur.

In addition, the first organic compound preferably includes a group represented by [—O—C(=O)—NH—] and at least one of the groups represented by [—O—C(=S)—NH—] or [—S—C(=O)—NH—]. It is preferable that the first organic compound (b1) have a silanol group or a group which forms a silanol group by hydrolysis in the molecule.

1) Radically Polymerizable Unsaturated Group

There are no specific limitations to the radically polymerizable unsaturated group included in the first organic compound (b1). An acryloyl group, methacryloyl group, vinyl group, propenyl group, butadienyl group, styryl group, ethynyl group, cinnamoyl group, malate group, and acrylamide group, can be given as suitable examples.

This radically polymerizable unsaturated group is a structural unit to effect an addition polymerization by active radicals.

2) The Group Shown by the Above Formula (5)

There are 6 types for the group [—X—C (=Y)—NH—] of the formula (5) included in the first organic compound (b1), specifically, they are [—O—C(=O)—NH—], [—O—C(=S)—NH—], [—S—C(=O)—NH—], [—NH—C(=O)—NH—], [—NH—C(=S)—NH—], and [—S—C(=S)—NH—]. These groups may be used either individually or in combinations of two or more. Among these, the combined use of the group [—O—C(=O)—NH—] and either one of the groups [—O—C(=S)—NH—] and [—S—C(=O)—NH—] is preferable from the viewpoint of ensuring excellent heat stability.

The above-mentioned group [—X—C (=Y)—NH—] of the formula (5) is considered to generate a moderate cohesive force by a hydrogen bond among molecules, which provides the cured product with characteristics such as superior mechanical strength, excellent adhesion properties to substrates, and good heat resistance.

3) Silanol Group or a Group Which Forms a Silanol Group by Hydrolysis

The first organic compound (b1) is preferably a compound having a silanol group (hereinafter may be called "silanol group-containing compound") or a compound which forms a silanol group by hydrolysis (hereinafter may be called "silanol group-forming compound"). Examples of silanol group-forming compounds are compounds having a Si atom that is at least partially substituted with an alkoxy group, aryloxy group, acetoxy group, amino group, or halogen atom. A preferred silanol group forming compound is an alkoxysilyl group-containing compound or an aryloxysilyl group-containing compound.

The silanol group or the silanol group-forming site of the silanol group-forming compound is the structural unit which bonds with the oxide particles by a condensation reaction or the condensation reaction after hydrolysis.

4) Preferable Embodiment

The compounds shown by the following formula (6) can be given as preferable examples of the first organic compounds (b1).

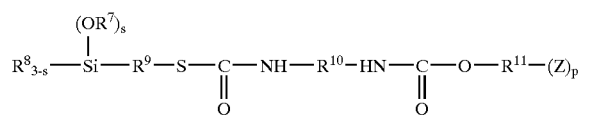

(6)

wherein $R^7$ and $R^8$ individually represent a hydrogen atom or an alkyl group having 1–8 carbon atoms for example a methyl group, ethyl group, propyl group, butyl group, cyclohexyl group, octyl group, or an aryl group having 6–12 C-atoms for example a phenyl group or xylyl group; $R^9$ is a divalent organic group having between 1 and 12 C atoms and has an aliphatic structure (which may be linear, branched, or cyclic) or an aromatic structure; $R^{10}$ is a divalent organic group having a molecular weight from 14 to 10,000, preferably from 76 to 500; $R^{11}$ is an organic group of a (p+1) valence and preferably selected from the group consisting of linear, branched, or cyclic, saturated or unsaturated hydrocarbon groups; $R^7$, $R^8$, $R^9$, $R^{10}$ and $R^{11}$ may contain hetero atoms like for example O, N, S, P; Z is a monovalent organic group having a polymerizable unsaturated group in the molecule which causes an inter-molecular cross-linking reaction in the presence of reactive radicals; p is an integer preferably from 1 to 20, and more preferably from 1 to 10, and most preferably from 1 to 5; and s is an integer from 1–3.

Examples of the group represented by $[(R^7O)_s R^8_{3-s}Si—]$, are a trimethoxy silyl group, triethoxy silyl group, triphenoxy silyl group, methyldimethoxy silyl group and dimethylmethoxy silyl group. Of these groups, trimethoxysilyl group, triethoxysilyl group, and the like are most preferred.

Examples of organic groups Z are an acryloyl group, methacryloyl group, vinyl group, propenyl group, butadienyl group, styryl group, ethynyl group, cinnamoyl group, malate group, and acrylamide group.

The first organic compound (b1) used in the present invention can be synthesized by a method described in Japanese Patent Application Laid-open No. 100111/1997, for example. A first method for synthesizing compound (b1) is a method comprising an addition reaction of a mercaptoalkoxysilane, a polyisocyanate compound, and an active hydrogen group-containing polymerizable unsaturated compound can be used. A second method comprises a direct reaction of a compound having both an alkoxy silyl group and an isocyanate group in the molecule with an active hydrogen-containing polymerizable unsaturated compound. Still another method (c) comprises an addition reaction of a compound having both a polymerizable unsaturated group and an isocyanate group in the molecule with a mercapto alkoxysilane compound or aminosilane compound.

Among these methods, the method (a) is preferably used to synthesize the compound shown by the above-mentioned formula (3).

(2) Second Organic Compound (b2)

The second organic compound (b2) used in the present invention is a compound containing a hydrolyzable group and a cationic polymerizable organic group. Preferably the cationic polymerizable group is selected from the group consisting of an oxetane group, 3,4-epoxycyclohexyl group, and epoxy group. The hydrolyzable group in the molecule is preferably a compound having a silanol group in the molecule or a compound which forms a silanol group by hydrolysis.

Preferably the second organic compound (b2) is selected from the compounds shown by the following formulas (1), (2), (3) or (4):

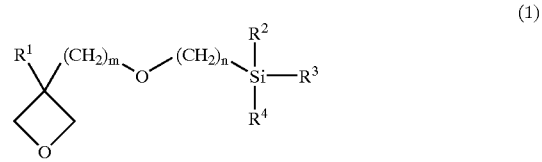

(1)

wherein $R^1$ is a hydrogen atom, alkyl group having from 1–10 C-atoms, fluorine atom, fluoroalkyl group, allyl group, aryl group having 6–20 C-atoms, furyl group, or ethynyl group, $R^2$, $R^3$, and $R^4$ are individually a hydrolyzable group, and m and n are individually an integer from 1 to 10;

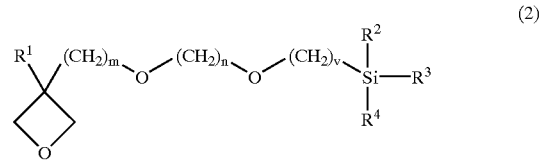

(2)

wherein $R^1$, $R^2$, $R^3$, and $R^4$, m, and n have the same meanings as defined for the formula (1) and v is an integer from 1 to 10;

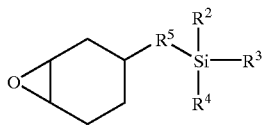

(3)

wherein R², R³, and R⁴ have the same meanings as defined for the formula (1) and R⁵ is a divalent organic group, having from 1 to 20 C-atoms;

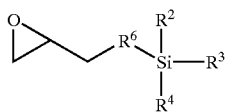

(4)

wherein R², R³, and R⁴ have the same meanings as defined for the formula (1) and R⁶ is a divalent organic group, having from 1 to 20 C-atoms.

The organic compounds shown by the above-described formula (1), (2), (3) or (4) can be given as examples of the second compound (b2).

Specific examples of the organic compound shown by the above-described formula (1) include the following compounds.

[(3-methyloxetan-3-yl)-methyloxypropyl]-triethoxysilane
[(3-methyloxetan-3-yl)-methyloxypropyl]-trimethoxysilane
[(3-methyloxetan-3-yl)-methyloxypropyl]-methyldiethoxysilane
[(3-methyloxetan-3-yl)-methyloxypropyl]-methyldimethoxysilane
[(3-methyloxetan-3-yl)-methyloxypropyl]-ethyldiethoxysilane
[(3-methyloxetan-3-yl)-methyloxypropyl]-ethyldimethoxysilane
[(3-ethyloxetan-3-yl)-methyloxypropyl]-triethoxysilane
[(3-ethyloxetan-3-yl)-methyloxypropyl]-trimethoxysilane
[(3-ethyloxetan-3-yl)-methyloxypropyl]-methyldiethoxysilane
[(3-ethyloxetan-3-yl)-methyloxypropyl]-methyldimethoxysilane
[(3-ethyloxetan-3-yl)-methyloxypropyl]-ethyldiethoxysilane
[(3-ethyloxetan-3-yl)-methyloxypropyl]-ethyldimethoxysilane
[(3-methyloxetan-3-yl)-methyloxybutyl]-triethoxysilane
[(3-methyloxetan-3-yl)-methyloxybutyl]-trimethoxysilane
[(3-methyloxetan-3-yl)-methyloxybutyl]-methyldiethoxysilane
[(3-methyloxetan-3-yl)-methyloxybutyl]-methyldimethoxysilane
[(3-methyloxetan-3-yl)-methyloxybutyl]-ethyldiethoxysilane
[(3-methyloxetan-3-yl)-methyloxybutyl]-ethyldimethoxysilane
[(3-ethyloxetan-3-yl)-propyloxypropyl]-triethoxysilane
[(3-methyloxetan-3-yl)-propyloxybutyl]-trimethoxysilane
[(3-methyloxetan-3-yl)-propyloxypropyl]-methyldiethoxysilane
[(3-methyloxetan-3-yl)-propyloxypropyl]-methyldimethoxysilane
[(3-methyloxetan-3-yl)-propyloxypropyl]-ethyldiethoxysilane
[(3-methyloxetan-3-yl)-propyloxypropyl]-ethyldimethoxysilane Preferred examples of the organic compound shown by the above-described formula (2) include the following compounds.

2-[(3-methyloxetan-3-yl)-methyloxypropyl]-ethoxyethyltrimethoxysilane
2-[(3-methyloxetan-3-yl)-methyloxypropyl]-ethoxyethyltriethoxysilane
2-[(3-methyloxetan-3-yl)-methyloxypropyl]-ethoxyethylmethyldimethoxysilane
2-[(3-methyloxetan-3-yl)-methyloxypropyl]-ethoxyethylmethyldiethoxysilane The compounds shown by the above-described formula (3) or (4) can be given as examples of the second organic compound (b2).

β-(3,4-epoxycyclohexyl)ethyltrimethoxysilane can be given as a preferred example of the compound shown by the above formula (3). Preferred examples of the organic compound shown by the above-described formula (4) include the following compounds:

γ-glycidoxypropyltrimethoxysilane
γ-glycidoxypropylmethyldimethoxysilane
γ-glycidoxypropyldimethylethoxysilane
3,4-epoxybutyltrimethoxysilane Most preferred are the compounds, [3-ethyloxetane-3-yl] methyloxypropyl]triethoxysilane,
β-(3,4-epoxycyclohexyl)ethyltrimethoxysilane,
γ-glycidoxypropyltrimethoxysilane.

Examples of commercially available products of the second organic compound (b2) are TESOX (manufactured by Toagosei Co., Ltd.), Sila Ace S510, S520, S530 (manufactured by Chisso Corp.), SH6040, AY43-026 (manufactured by Toray-Dow Corning Silicone Co., Ltd.), KBM303, KBM403, and KBE402 (manufactured by Shin-Etsu Chemical Co., Ltd.).

It is preferable that the second organic compound (b2) have a silanol group or a group which forms a silanol group by hydrolysis in the molecule.

Examples of silanol group-forming compounds are compounds having a Si atom that is at least partially substituted with an alkoxy group, aryloxy group, acetoxy group, amino group, or halogen atom. A preferred silanol group forming compound is an alkoxysilyl group-containing compound or an aryloxysilyl group-containing compound.

As previously mentioned in connection with the first organic compound (b1), the silanol group or the silanol group-forming site of the silanol group-forming compound is the structural unit which bonds with the oxide particles (a) by a condensation reaction or the condensation reaction following hydrolysis.

(3) Amount of Modification Component (b)

The amount of the modification component (b) to be added to the composition is in the range of 0.1 to 60 wt %, preferably 0.1 to 40 wt %, and more preferably 1 to 30 wt %, for 100 wt % of the amount of the reactive particles (A), which is the total weight of the components (a) and (b), specifically, the total of the oxide particles (a) and the modification component (b). If less than 0.1 wt %, dispersibility of the reactive particles (A) in the resulting composition may be impaired and transparency, scratch resistance, and chemicals resistance of the cured products may be insufficient. If more than 60 wt %, hardness of the cured product may be insufficient.

In particular, a cured product having excellent chemicals resistance can be obtained by adding both the first organic compound (b1) and the second organic compound (b2) as the modification component (b) when the reactive particles (A) are prepared. The ratio of the first organic compound (b1) and the second organic compound (b2) used for the preparation of reactive particles (A) is preferably 98:2 to 2:98, and more preferably 96:4 to 15:85. If the ratio (b1):(b2) is in the range of 100:0–99:1 or 1:99–0:100, the chemicals resistance may not be sufficient.

3. Method of Manufacturing Reactive Particles (A)

There are no specific limitations to the method of manufacturing reactive particles (A) of the present invention. A method of reacting the oxide particles (a) and the modification component (b) can be given as an example. Oxide particles (a) are known to have moisture on the surface of particles as absorbed water under usual storage conditions. In addition, components which react with a silanol group-forming compound such as a hydroxide, hydrate, or the like are presumed to be present at least on the surface. Therefore, the reactive particles (a) can be prepared by mixing the silanol group-forming compound and oxide particles, and heating the mixture while stirring. In order to bond the oxide particles (a) and the silanol group-forming sites of the modification component (b) efficiently, it is desirable to carry out the reaction in the presence of water. However, water need not be present when the modification component (b) possesses a silanol group. Therefore, the reactive particles (A) can be produced by a method including at least the operation of mixing the oxide particles (a) and the modification component (b).

In this instance, either the oxide particles (a) may be added to a mixture of the first organic compound (b1) and the second organic compound (b2), or the first organic compound (b1) and the second organic compound (b2) may be separately added to the oxide particles (a).

Preferably, a dehydrating agent is added to promote the reaction.

As a dehydrating agent, inorganic compounds such as zeolite, anhydrous silica, and anhydrous alumina, and organic compounds such as methyl orthoformate, ethyl orthoformate, tetraethoxymethane, and tetrabutoxymethane can be used. Preferably, organic compounds are used as dehydrating agents. Most preferred are ortho esters for example methyl orthoformate and ethyl orthoformate.

The amount of the alkoxysilane compound bonded with the reactive particles (A) can be determined as a weight loss (%) when a dry powder is burnt completely in air in a thermogravimetric analysis at a temperature from 110° C. to 800° C. in air.

II. Curable Composition

The present invention relates also to a curable composition comprising reactive particles (A).

The curable composition of the present invention comprises the reactive particles (A) and a compound having at least two polymerizable groups per molecule (B) (hereinafter may be called "polymerizable compound (B)"), and, preferably, may further comprises a polymerization initiator (C).

1. Reactive Particles (A)

The above-described reactive particles (A) can be used in the curable composition of the present invention.

The amount of the reactive particles (A) incorporated in the curable composition (A) is from 5 to 90 wt %, and preferably from 10 to 70 wt %, for 100 wt % of the total reactive components in the composition. If less than 5 wt %, hardness of the cured products may be insufficient; if more than 90 wt %, there may be an occasion where coatings are not cured and no coating films can be produced. The amount of the curable particles (A) does not include the amount of solvents when the curable particles (A) are used in the form of a solvent dispersion sol.

2. Polymerizable Compound (B)

There are no specific limitations to the polymerizable compound (B) used in the present invention. Preferable examples are compounds having two or more radically polymerizable unsaturated groups in the molecule (B1) (hereinafter called "radically polymerizable compound (B1)") and compounds having two or more cationically polymerizable groups in the molecule (B2) (hereinafter called "cationically polymerizable compound (B2)"). A compound having one radically polymerizable group and one cationically polymerizable group may also be used as the polymerizable compound (B). The polymerizable compound (B) forms a three-dimensional crosslinking structure by reacting with the above-mentioned modification component (b) which constitutes the reactive particles (A), thereby improving coatability of the composition and improving hardness and abrasion resistance of cured coatings.

(1) Radically Polymerizable Compound (B1)

There are no specific limitations to the types of radically polymerizable compound (B1) so long as the compound has two or more radically polymerizable unsaturated groups. (Meth)acrylic esters and vinyl compounds can be given as examples. Of these, (meth)acrylic esters are preferred. The polymerizable compound (B1) forms a three-dimensional crosslinking structure by reacting with first organic compound (b1) which is part of the reactive particles (A).

The following compounds can be given as specific examples of the radically polymerizable compound (B1) used in the present invention.

Given as examples of (meth)acrylic esters are trimethylolpropane tri(meth)acrylate, ditrimethylolpropane tetra(meth)acrylate, pentaerythritol tri(meth)acrylate, pentaerythritol tetra(meth)acrylate, dipentaerythritol penta(meth)acrylate, dipentaerythritol hexa(meth)acrylate, glycerol tri(meth)acrylate, tris(2-hydroxyethyl) isocyanurate tri(meth)acrylate, ethylene glycol di(meth)acrylate, 1,3-butanediol di(meth)acrylate, 1,4-butanediol di(meth)acrylate, 1,6-hexanediol di(meth)acrylate, neopentyl glycol di(meth)acrylate, diethylene glycol di(meth)acrylate, triethylene glycol di(meth)acrylate, dipropylene glycol di(meth)acrylate, and bis(2-hydroxyethyl) isocyanurate di(meth)acrylate; as well as ethylene oxide or propylene oxide addition poly(meth)acrylates to these (meth)acrylates, oligoester (meth)acrylates, oligoether (meth)acrylates, oligourethane (meth)acrylates, and oligoepoxy (meth)acrylates having two or more (meth)acryloyl groups in the molecule, and the like. Among these, dipentaerythritol hexa(meth)acrylate, dipentaerythritol penta(meth)acrylate, pentaerythritol tetra(meth)acrylate, and ditrimethylolpropane tetra(meth)acrylate are desirable.

Examples of vinyl compounds are divinylbenzene, ethylene glycol divinyl ether, diethylene glycol divinyl ether and triethylene glycol divinyl ether.

Given as examples of commercially available products of radically polymerizable compound (B1) are the products having the trade names Aronix M-400, M-408, M-450, M-305, M-309, M-310, M-315, M-320, M-350, M-360, M-208, M-210, M-215, M-220, M-225, M-233, M-240, M-245, M-260, M-270, M-1100, M-1200, M-1210, M-1310, M-1600, M-221, M-203, TO-924, TO-1270, TO-1231, TO-595, TO-756, TO-1343, TO-902, TO-904, TO-905, and TO-1330 (manufactured by Toagosei Co., Ltd.); KAYARAD D-310, D-330, DPHA, DPCA-20, DPCA-30, DPCA-60, DPCA-120, DN-0075, DN-2475, SR-295, SR-355, SR-399E, SR-494, SR-9041, SR-368, SR-415, SR-444, SR-454, SR-492, SR-499, SR-502, SR-9020, SR-9035, SR-111, SR-212, SR-213, SR-230, SR-259, SR-268, SR-272, SR-344, SR-349, SR-601, SR-602, SR-610, SR-9003, PET-30, T-1420, GPO-303, TC-120S, HDDA, NPGDA, TPGDA, PEG400DA, MANDA, HX-220, HX-620, R-551, R-712, R-167, R-526, R-551, R-712, R-604, R-684, TMPTA, THE-330, TPA-320, TPA-330, KS-HDDA, KS-TPGDA, KS-TMPTA (manufactured by Nippon Kayaku Co., Ltd.); and Light Acrylate PE-4A, DPE-6A and DTMP-4A (manufactured by Kyoeisha Chemical Co., Ltd.).

(2) Cationically Polymerizable Organic Compound (B2)

As examples of the cationically polymerizable compound (B2), cationically polymerizable compounds having two or more oxetane groups, 3,4-epoxycyclohexyl groups, and epoxy groups can be given.

The cationically polymerizable compound (B2) forms a three-dimensional crosslinking structure by reacting with the second organic compound (b2) which constitutes the reactive particles (A).

The following compounds can be given as specific examples of such a cationically polymerizable compound (B2).

Examples of compounds having two or more oxetane groups are 3,7-bis(3-oxetanyl)-5-oxa-nonane, 3,3'-(1,3-(2-methylenyl)propanediylbis(oxymethylene))bis-(3-ethyloxetane), 1,4-bis[(3-ethyl-3-oxetanylmethoxy)methyl] benzene, 1,2-bis[(3-ethyl-3-oxetanylmethoxy)methyl] ethane, 1,3-bis[(3-ethyl-3-oxetanylmethoxy)methy] propane, ethylene glycol bis(3-ethyl-3-oxetanylmethyl) ether, dicyclopentenyl bis(3-ethyl-3-oxetanylmethyl) ether, triethylene glycol bis(3-ethyl-3-oxetanylmethyl) ether, tetraethylene glycol bis(3-ethyl-3-oxetanylmethyl) ether, tricyclodecanediyldimethylenebis(3-ethyl-3-oxetanylmethyl) ether, trimethylolpropane tris(3-ethyl-3-oxetanyl methyl) ether, 1,4-bis(3-ethyl-3-oxetanylmethoxy) butane, 1,6-bis(3-ethyl-3-oxetanylmethoxy)hexane, pentaerythritol tris(3-ethyl-3-oxetanylmethyl) ether, pentaerythritol tetrakis(3-ethyl-3-oxetanylmethyl) ether, polyethylene glycol bis(3-ethyl-3-oxetanylmethyl) ether, dipentaerythritol hexakis(3-ethyl-3-oxetanylmethyl) ether, dipentaerythritol pentakis(3-ethyl-3-oxetanylmethyl) ether, dipentaerythritol tetrakis(3-ethyl-3-oxetanylmethyl) ether, caprolactone-modified dipentaerythritol hexakis(3-ethyl-3-oxetanylmethyl) ether, caprolactone-modified dipentaerythritol pentakis(3-ethyl-3-oxetanylmethyl) ether, ditrimethylolpropane tetrakis(3-ethyl-3-oxetanylmethyl) ether, EO-modified bisphenol A bis(3-ethyl-3-oxetanylmethyl) ether, PO-modified bisphenol A bis(3-ethyl-3-oxetanylmethyl) ether, EO-modified hydrogenated bisphenol A bis(3-ethyl-3-oxetanylmethyl) ether, PO-modified hydrogenated bisphenol A bis(3-ethyl-3-oxetanylmethyl) ether and EO-modified bisphenol F bis(3-ethyl-3-oxetanylmethyl) ether.

Examples of compounds having two or more 3,4-epoxycyclohexyl groups are 3,4-epoxycyclohexylmethyl-3',4'-epoxycyclohexanecarboxylate, 2-(3,4-epoxycyclohexyl-5,5-spiro-3,4-epoxy)cyclohexane-m-dioxane, bis(3,4-epoxycyclohexylmethyl)adipate, bis(3,4-epoxy-6-methylcyclohexylmethyl)adipate, 3,4-epoxy-6-methylcyclohexyl-3',4'-epoxy-6'-methylcyclohexane carboxylate, methylenebis(3,4-epoxycyclohexane), Dicyclopentadiene diepoxide, dicyclopentadiene diepoxide, ethylene glycol di(3,4-epoxycyclohexylmethyl), ethylenebis(3,4-epoxycyclohexanecarboxylate), and lactone-modified 3,4-epoxycyclohexylmethyl-3',4'-epoxycyclohexane carboxylate.

Examples of the compounds having two or more epoxy groups include (1) epoxy-modified compounds obtained by epoxidating carbon—carbon double bonds of a compound having ethylenically unsaturated groups with a suitable oxidizer for example hydrogen peroxide and peroxy acid, (2) epoxy group-containing polymers obtained by the polymerization of a radically polymerizable monomer having an epoxy group in the molecule, and (3) epoxy group-containing compounds obtained by a known method such as a method of reacting a compound having functional groups for example hydroxyl groups and epichlorohydrin.

Given as examples of the epoxy-modified compound (1) above are compounds obtained by epoxidating a polymer or copolymer, such as a polymer of conjugated diene monomers, copolymer of a conjugated diene monomer and a compound having ethylenically unsaturated groups, copolymer of a diene monomer and a compound having ethylenically unsaturated groups, or natural rubber. Specific examples include compounds obtained by epoxidating a polymer of a conjugated diene monomer for example butadiene monomer and isoprene monomer; compounds obtained by epoxidating a copolymer of a conjugated diene monomer and a compound having ethylenically unsaturated groups for example ethylene, propylene, butene, isobutylene and styrene; compounds obtained by epoxidating a copolymer of a compound having ethylenically unsaturated groups and a diene monomer for example dicyclopentadiene; and compounds obtained by epoxidating double bonds in the molecular of natural rubber.

Examples of the epoxy group-containing polymers (2) above are homopolymers of glycidyl (meth)acrylate, vinyl cyclohexene oxide, 4-vinylepoxycyclohexane, 3,4-epoxycyclohexylmethyl (meth)acrylate and caprolactone-modified 3,4-epoxycyclohexylmethyl (meth)acrylate, or the like monomers, and copolymers obtained by copolymerization of these monomers and vinyl monomers.

Given as examples of the epoxy group-containing compound obtained by the reaction of a compound having functional groups such as hydroxyl groups and epichlorohydrin mentioned in (3) above are epoxy compounds obtained by the reaction of bisphenol A or bisphenol F and epichlorohydrin, epoxy compounds obtained by the reaction of a phenol novolak and epichlorohydrin and epoxy compounds obtained by the reaction of a cresol novolak and epichlorohydrin. As examples of commercially available products of these compounds, Epicoat 828, 157S70, 152, 154 (trade names) manufactured by Yuka Shell Epoxy Kabushiki Kaisha can be given.

Given as examples of other cationically polymerizable compounds (B) are glycidyl ethers such as bisphenol A diglycidyl ether, bisphenol F diglycidyl ether, bisphenol S diglycidyl ether, hydrogenated bisphenol A diglycidyl ether, hydrogenated bisphenol F diglycidyl ether, hydrogenated bisphenol AD diglycidyl ether, brominated bisphenol A diglycidyl ether, brominated bisphenol F diglycidyl ether, brominated bisphenol S diglycidyl ether, 1,4-butanediol diglycidyl ether, 1,6-hexanediol diglycidyl ether, glycerol triglycidyl ether, trimethylolpropane triglycidyl ether, polyethylene glycol diglycidyl ether, and polypropylene glycol diglycidyl ether; polydiglycidyl ethers of polyether polyols obtained by the addition of one or more alkylene oxides to an aliphatic polyhydric alcohol such as ethylene glycol, propylene glycol, or glycerol; diglycidyl esters of aliphatic long-chain dibasic acids; glycidyl esters of higher fatty acids; epoxidated soybean oil; and epoxidated linseed oil.

Of the above cationically polymerizable compounds (B2), Epicoat 828, 157S70, 152 and 154 are preferred.

These cationically polymerizable compounds (B2) can be used either individually or in combinations of two or more.

(3) Amount of Polymerizable Compound (B)

The amount of the polymerizable compound (B) used in the present invention is preferably from 10–95 wt %, and more preferably from 30–90 wt %, for 100 wt % of the total of reactive components in the composition. If less than 10 wt %, film forming capability of the cured products may be inadequate; if more than 95 wt %, hardness of the cured products may be insufficient.

As required, a compound having one polymerizable group in the molecule may be used in the composition of the present invention in addition to the polymerizable compound (B).

4. Polymerization Initiator

In addition to the above-mentioned reactive particles (A) and polymerizable compound (B), a polymerization initiator (C) may be added to the composition of the present invention, as required.

A radical polymerization initiator (hereinafter may be called "polymerization initiator (C1)") or a cationic polymerization initiator (hereinafter may be called "polymerization initiator (C2)") can be given as examples of the polymerization initiator (C).

(1) Polymerization Initiator (C1)

There are no specific limitations to the polymerization initiator (C1) used in the present invention inasmuch as such an initiator can generate radicals by irradiation of light and initiate polymerization. Examples of such intiators include acetophenone, acetophenone benzyl ketal, 1-hydroxycyclohexyl phenyl ketone, 2,2-dimethoxy-1,2-diphenylethan-1-one, xanthone, fluorenone, benzaldehyde, fluorene, anthraquinone, triphenylamine, carbazole, 3-methylacetophenone, 4-chlorobenzophenone, 4,4'-dimethoxybenzophenone, 4,4'-diaminobenzophenone, benzoin propyl ether, benzoin ethyl ether, benzyl dimethyl ketal, 1-(4-isopropylphenyl)-2-hydroxy-2-methylpropan-1-one, 2-hydroxy-2-methyl-1-phenylpropan-1-one, thioxanethone, diethylthioxanthone, 2-isopropylthioxanthone, 2-chlorothioxanthone, 2-methyl-1-[4-(methylthio)phenyl]-2-morpholino-propan-1-one, 2-benzyl-2-dimethylamino-1-(4-morpholinophenyl)-butanone-1,4-(2-hydroxyethoxy) phenyl-(2-hydroxy-2-propyl)ketone, 2,4,6-trimethylbenzoyl diphenylphosphine oxide, bis-(2,6-dimethoxybenzoyl)-2,4, 4-trimethylpentylphosphine oxide, and oligo(2-hydroxy-2-methyl-1-(4-(1-methylvinyl)phenyl) propanone).

These compounds may be used either individually or in combinations of two or more.

Examples of commercially available products of polymerization initiator (C1) are Irgacure 184, 369, 651, 500, 819, 907, 784, 2959, CGI1700, CGI1750, CGI1850, CG24–61, Darocur 1116, 1173 (manufactured by Ciba Specialty Chemicals Co., Ltd.), Lucirin TPO (manufactured by BASF), Ubecryl P36 (manufactured by UCB), and Esacure KIP150, KIP65LT, KIP100F, KT37, KT55, KTO46, KIP75/B (manufactured by Lamberti).

(2) Polymerization Initiator (C2)

There are no specific limitations to the polymerization initiator (C2) inasmuch as such a polymerization initiator is decomposed and generates cations by irradiation of light. Onium salts having a structure shown by the following formula (8) can be given as preferable examples.

The onium salts liberate a Lewis acid upon exposure to light.

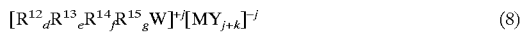

$$[R^{12}_d R^{13}_e R^{14}_f R^{15}_g W]^{+j}[MY_{j+k}]^{-j} \qquad (8)$$

wherein the cation is an onium ion; W is S, Se, Te, P, As, Sb, Bi, O, I, Br, Cl, or —N≡N; $R^{12}$, $R^{13}$, $R^{14}$, and $R^{15}$ are the same or different organic groups; d, e, f, and g are integers from 0 to 3, provided that (d+e+f+g) is equal to the of valence of W. M is a metal or a metalloid which constitutes a center atom of the halide complex $[MX_{j+k}]$, for example, M is B, P, As, Sb, Fe, Sn, Bi, Al, Ca, In, Ti, Zn, Sc, V, Cr, Mn, Co, and the like. Y is a halogen atom such as F, Cl, and Br; j is a positive charge of a halide complex ion; and k is a valence.

As specific examples of an anion $[MX_{j+k}]^{-j}$ in the formula (8), tetrafluoroborate ($BF_4^-$), hexafluorophosphate ($PF_6^-$), hexafluoroantimonate ($SbF_6^-$), hexafluoroarsenate ($AsF_6^-$), hexachloroantimonate ($SbCl_6^-$), can be given.

In addition, onium salts having an anion of the formula $[MY_k(OH)^-]$ can also be used. Moreover, onium salts having other anions such as a perchloric acid ion ($ClO_4^-$), trifluoromethanesulfonic acid ion ($CF_3SO_3^-$), fluorosulfonic acid ion ($FSO_3^-$), toluenesulfonic acid ion, trinitrobenzenesulfonic acid anion, and trinitrotoluenesulfonic acid anion can be also used.

Of these onium salts, aromatic onium salts are particularly effective as polymerization initiator (C2). Particularly preferable onium salts are aromatic halonium salts disclosed in Japanese Patent Applications Laid-open No. 151996/1975 and No. 158680/1975, VIA group aromatic onium salts disclosed in Japanese Patent Applications Laid-open No. 151997/1975, No. 30899/1977, No. 55420/1981, and No. 125105/1980; VA group aromatic onium salts disclosed in Japanese Patent Application Laid-open No. 158698/1975; oxosulfoxonium salts disclosed in Japanese Patent Applications Laid-open No. 8428/1981, No. 149402/1981, and No. 192429/1982; aromatic diazonium salts disclosed in Japanese Patent Application Laid-open No. 17040/1974; thiopyrylium salts disclosed in U.S. Pat. No. 4,139,655; and the like. In addition, iron/allene complex initiators, aluminum complex/photolysis silicon compound initiators, and the like can also be given as examples.

These compounds may be used either individually or in combinations of two or more.

As examples of commercially available products suitably used as polymerization initiator (C2), UVI-6950, UVI-6970, UVI-6974, UVI-6990 (manufactured by Union Carbide Corp.), Adekaoptomer SP-150, SP-151, SP-170, SP-171 (manufactured by Asahi Denka Kogyo Co., Ltd.), Irgacure 261 (manufactured by Ciba Specialty Chemicals Co.), CI-2481, CI-2624, CI-2639, CI-2064 (manufactured by Nippon Soda Co., Ltd.), CD-1010, CD-1011, CD-1012 (manufactured by Sartomer Co., Ltd.), DTS-102, DTS-103, NAT-103, NDS-103, TPS-103, MDS-103, MPI-103, BBI-103 (manufactured by Midori Chemical Co., Ltd.), PCI-061T, PCI-062T, PCI-020T, PCI-022T (manufactured by Nippon Kayaku Co., Ltd.), and the like can be given. Of these, UVI-6970, UVI-6974, UVI-6990, Adekaoptomer SP-170, SP-171, CD-1012, and MPI-103 are particularly preferable in view of excellent surface curability of the resulting curing composition.

(3) Amount of Polymerization Initiator (C)

The amount of polymerization initiator (C) incorporated in the curable composition is from 0.01–20 wt %, and preferably from 0.1–15 wt % of the total reactive components in the composition. If less than 0.01 wt %, the resulting curing composition exhibits only poor surface curability, giving a rise to an impair external appearance after a moisture-heat resistance test; if more than 20 wt %, cured products may have insufficient hardness.

If required, a photo-polymerization initiator and a heat-polymerization initiator can be used together when curing the resin composition of the present invention. Peroxide compounds, azo compounds, and the like can be given as preferable examples of heat polymerization initiators. Specific examples include benzoyl peroxide, t-butyloxy peroxybenzoate and azobisisobutyronitrile.

5. Other Components

Photosensitizers (polymerization accelerator), reactive diluents, and the like can be added to the photocurable resin composition of the present invention as optional components, insofar as the effects of the resin composition are not impaired.

Examples of the photosensitizers are amine compounds such as triethanolamine, methyldiethanolamine, triethylamine, and diethylamine, thioxanethone, derivatives of thioxanethone, anthraquinone, derivatives of anthraquinone, anthracene, derivatives of anthracene, perylene, derivatives of perylene, benzophenone, and benzoin isopropyl ether. Examples of the reactive diluents are cationically polymerizable substances which are copolymerizable with the components (A) and (B).

Preferred examples of reactive diluents are polyols: A polyol can be useful for providing photocurability in the resin composition as well as form stability (controlling deformation with time) and physical stability (controlling change in mechanical characteristics with time) for the cured products. The polyol contains preferably two or more, and still more preferably from 2 to 6 hydroxyl groups in one molecule. If a polyol containing less than two hydroxyl groups in one molecule is used, photocurability of the resin composition may not be sufficiently improved, and mechanical characteristics, may decrease. If a polyol containing more than six hydroxyl groups in one molecule is used, the resulting three-dimensional objects may exhibit insufficient elongation and reduced moisture resistance.

Examples of such polyols are polyether polyols, polycaprolactone polyols and polyester polyols produced by modifying with polyester consisting of dibasic acid and diols.

Moreover, various additives may be added to the photocurable resin composition of the present invention as other optional components insofar as the objects and effects of the present invention are not impaired. Examples of such additives include polymers or oligomers such as an epoxy resin, polyamide, polyamideimide, polyurethane, polybutadiene, polychloroprene, polyether, polyester, styrene-butadiene block copolymer, petroleum resin, xylene resin, ketone resin, cellulose resin, fluorine-containing oligomer, silicone-containing oligomer, and polysulfide oligomer, polymerization inhibitors such as phenothiazine and 2,6-di-t-butyl-4-methylphenol, polymerization initiation adjuvant, leveling agents, wettability improvers, surfactants, plasticizers, UV absorbers, silane coupling agents, pigments, dyes, and the like.

6. Method of Coating the Composition

The composition of the present invention is suitable as a coating material. Plastics (polycarbonate, polymethylene acrylate, polystyrene, polyester, polyolefin, epoxy, melamine, triacetyl cellulose, ABS, acrylonitrile-styrene resin, norbornene resin, etc.), metals, woods, papers, glasses and slates can be given as examples of the substrates to which the composition is coated. These substrates may be either in the shape of a film or a three-dimensional object. Conventional coating methods such as dipping, spray coating, flow coating, shower coating, roll coating, spin coating, brush coating, and the like can be given as coating methods. The thickness of coating films after cure and drying is usually from 0.05 to 400 $\mu$m, and preferably from 0.1 to 200 $\mu$m.

To adjust the coating film thickness, the composition of the present invention can be used by diluting with a solvent. When used as a coating material, for example, the viscosity of the composition is usually from 0.1 to 50,000 mPa·s/25° C., and preferably from 0.5 to 10,000 mPa·s/25° C.

7. Method of Curing the Composition

The composition of the present invention is cured by heat and/or radiation (lights) by using photo-polymerization initiators and/or heat-polymerization initiators as required, as mentioned above.

When the composition is cured by heat, an electric heater, infrared ray lamp, hot blast, and the like can be used as the heat source.

When radioactive rays (light) are used, there are no specific limitations to the source of the radioactive rays so long as the composition can be cured in a short period of time after coating. Examples of the source of infrared rays are a lamp, resistance heating plate, and laser. Examples of the source of visible rays are sunlight, a lamp, fluorescent lamp and laser. Examples of sources of ultraviolet rays are a mercury lamp, halide lamp, and laser. Examples of the source of electron beams are a system of utilizing thermo-electrons produced by a commercially available tungsten filament, a cold cathode method generating electron beams by passing a high voltage pulse through a metal, and a secondary electron method which utilizes secondary electrons produced by collision of ionized gaseous molecules and a metal electrode can be given. As the source of α-rays, β-rays, and γ-rays, for example, fissionable materials such as $Co^{60}$ and the like can be given. These radioactive lays can be used either individually or in combinations of two or more. In the latter case, the two or radioactive lays may be used either simultaneously or with a certain intervals.

III. Cured Products

The cured products of the present invention can be obtained by applying the composition onto a plastic substrates, for example, and curing the coating. Specifically, such a cured product can be obtained as a coated form by applying the composition to an object, drying the coating by removing volatile components at a temperature preferably from 0 to 200° C., and curing the coating by heat and/or radioactive rays. Curing by heat is preferably performed under the conditions from 20 to 150° C. for 10 seconds to 24 hours. When the coating is cured by radioactive rays, use of ultraviolet rays and electron beams are preferable. Ultraviolet rays are irradiated at a dose preferably from 0.01–10 $J/cm^2$, and more preferably from 0.1 to 2 $J/cm^2$. Electron beams are irradiated under the conditions of 10–300 KV, an electron density of 0.02–0.30 $mA/cm^2$, and at a dose from 1–10 Mrad.

Because the cured products of the present invention possess excellent hardness, scratch resistance, abrasion resistance, low curling properties, adhesion, and chemicals resistance, particularly superior chemicals resistance, the products are suitable for use as a protective coating material to prevent stains or scratches on plastic optical parts, touch panels, film-type liquid crystal elements, plastic containers, or flooring materials, wall materials, and artificial marbles which are used for architectural interior finish; as an adhesive for various substrates, a sealing material, and a vehicle for printing ink; and the like.

EXAMPLES

The present invention will be explained in more detail by examples, which are not intended to be limiting of the present invention.

In the description below, "parts" and "%" respectively mean "parts by weight" and "wt %", unless otherwise indicated.

The words "solid content" in the present invention means the content of components excluding volatile components such as solvents from the composition in the present invention, specifically, "solid content" means the content of a residue (nonvolatile components) obtained by drying the composition for one hour on a hot plate at 120° C.

Synthesis of Organic Compound (b1)

Synthetic Example 1

20.6 parts of isophorone diisocyanate was added dropwise to a solution of 7.8 parts of mercaptopropyltrimethoxysilane and 0.2 part of dibutyltin dilaurate in dry air in one hour while stirring at 50° C. The mixture was stirred for a further three hours at 60° C. After the addition of 71.4 parts of pentaerythritol triacylate dropwise in one hour at 30° C., the mixture was stirred for a further three hours at 60° C. with heating to obtain an organic compound (b1-1). The amount of isocyanate remaining in the product was analyzed to find that the remaining amount was 0.1% or less, indicating that the reaction was completed almost quantitatively.

Synthetic Example 2

38.7 parts of 1,3-bis(isocyanatemethyl)cyclohexane was added to a solution of 38.4 g parts of mercaptopropyltrimethoxysilane and 0.2 part of dibutyl tin dilaurate in dry air in one hour while stirring at 50° C. The mixture was stirred for a further three hours at 70° C. After the addition of 22.7 parts of 2-hydroxyethyl acrylate dropwise in one hour at 30° C., the mixture was stirred for a further ten hours at 60° C. with heating to obtain an organic compound (b1-2). The amount of isocyanate remaining in the product was analyzed to find that the remaining amount was 0.1% or less, indicating that the reaction was completed almost quantitatively.

Preparation of Reactive Particles (A)

Examples for preparing reactive particles (A) are shown in Preparation Examples 1 to 6, and Comparative Examples 1. The results are summarized in Table 1.

Example 1

A mixture of 4.4 parts of the organic compound (b1-1) synthesized in Synthetic Example 1, 1.6 parts of [3-ethyloxetanyl-3-yl]methyloxypropyl]triethoxysilane (b2-1) ("TESOX" manufactured by Toagosei Co., Ltd.), 94.0 parts of methyl ethyl ketone silica sol (a1), ("MEK-ST" manufactured by Nissan Chemical Industries, Ltd., number average particle diameter 0.022 μm, silica concentration: 30%), 0.01 part of p-methoxyphenol, and 0.4 part of ion-exchanged water was stirred for 3 hours at 60° C. After the addition of 2.8 parts of methyl ortho-formate, the mixture was stirred for a further one hour while heating at 60° C. to obtain a transparent colorless dispersion liquid of reactive particles (A) (Dispersion Liquid a). 2 g of the Dispersion Liquid a was weighed on an aluminum dish and dried for one hour on a hot plate at 120° C. The dried material was weighed to confirm that the solid content was 33%.

Example 2

A mixture of 8.3 parts of the organic compound (b1–2) synthesized in Synthetic Example 2, 0.4 part of β-(3,4-epoxycyclohexyl)ethyltrimethoxysilane (b2-2) ("Sila Ace S530" manufactured by Chisso Corp.), 91.3 parts of methyl ethyl ketone silica sol (a1), 0.01 part of p-methoxyphenol, and 0.8 part of ion-exchanged water was stirred for 3 hours at 60° C. After the addition of 4.9 parts of methyl ortho-formate, the mixture was stirred for a further one hour while heating at 60° C. to obtain a semi-transparent dispersion liquid of reactive particles (A) (Dispersion Liquid b). The solid content of the Dispersion Liquid b was measured in the same manner as in Example 1 to confirm that the solid content was 34%.

Example 3

A mixture of 4.8 parts of the organic compound (b1-1) synthesized in Synthetic Example 1, 0.8 part of [3-ethyloxetanyl-3-yl]-ethyloxypropyl]triethoxysilane (b2-1), 94.4 parts of iso-propanol alumina sol (a2) ("AS-150I" manufactured by Sumitomo Osaka Cement Co., Ltd., number average particle diameter 0.013 μm, alumina concentration: 15%), 0.01 part of p-methoxyphenol, and 0.2 part of ion-exchanged water was stirred for 3 hours at 60° C. After the addition of 1.7 parts of methyl ortho-formate, the mixture was stirred for a further one hour while heating at 60° C. to obtain a dispersion liquid of reactive particles (A) (Dispersion Liquid c). The solid content of the Dispersion Liquid c was measured in the same manner as in Example 1 to confirm that the solid content was 19%.

Example 4

A mixture of 2.2 parts of the organic compound (b1-1) synthesized in Synthetic Example 1, 0.8 part of [3-ethyloxetanyl-3-yl]methyloxypropyl]triethoxysilane (b2-1), 97.0 parts of toluene zirconia sol(a3) (number average particle diameter 0.01 μm, zirconia concentration: 30%), 0.01 part of p-methoxyphenol, 31.5 parts of methyl ethyl ketone, and 0.2 part of ion-exchanged water was stirred for 3 hours at 60° C. After the addition of 1.4 parts of methyl ortho-formate, the mixture was stirred for a further one hour at the same temperature to obtain a dispersion liquid of reactive particles (A) (Dispersion Liquid d). The solid content of the Dispersion Liquid d was measured in the same manner as in Example 1 to confirm that the solid content was 24%.

Example 5

A mixture of 2.2 parts of the organic compound (b1-1) synthesized in Synthetic Example 1, 0.4 part of β-(3,4-epoxycyclohexyl)ethyltrimethoxysilane (b2-2), 97.0 parts of toluene zirconia sol(a3), 0.01 part of p-methoxyphenol, 32.0 parts of methyl ethyl ketone, and 0.2 part of ion-exchanged water was stirred for 3 hours at 60° C. After the addition of 1.4 parts of methyl ortho-formate, the mixture was stirred for a further one hour at the same temperature to obtain a dispersion liquid of reactive particles (A) (Dispersion Liquid e). The solid content of the Dispersion Liquid e was measured in the same manner as in Example 1 to confirm that the solid content was 24%.

Example 6

A mixture of 2.2 parts of the organic compound (b1-1) synthesized in Synthetic Example 1, 1.6 parts of γ-glycidoxypropyltrimethoxysilane (b2-3), 96.2 parts of toluene zirconia sol(a3), 0.01 part of p-methoxyphenol, 31.2 parts of methyl ethyl ketone, and 0.8 part of ion-exchanged water was stirred for 3 hours at 60° C. After the addition of 3.0 parts of methyl ortho-formate, the mixture was stirred for a further one hour at the same temperature to obtain a dispersion liquid of reactive particles (A) (Dispersion Liquid f). The solid content of the Dispersion Liquid f was measured in the same manner as in Example 1 to confirm that the solid content was 24%.

Comparative Example 1

A mixture of 4.4 parts of the organic compound (b1-1) synthesized in Synthetic Example 1, 95.6 parts of methyl ethyl ketone silica sol (a1), 0.01 part of p-methoxyphenol, and 0.2 part of ion-exchanged water was stirred for 3 hours at 60° C. After the addition of 1.0 part of methyl ortho-formate, the mixture was stirred for a further one hour while heating at 60° C to obtain a colorless transparent dispersion liquid of reactive particles which do not contain the second organic compound (b2) (Dispersion Liquid g). 2 g of the Dispersion Liquid g was weighed on an aluminum dish and dried for one hour on a hot plate at 120° C. The dried material was weighed to confirm that the solid content was 33%.

morpholinopropanone-1, 3.0 parts of bis(4-(diphenylsulfonio)phenyl)sulfide bishexafluoroantimonate ("UVI-6974" manufactured by Union Carbide Corp.), and 4.0 parts of bisphenol A novolak epoxy resin ("Epicoat 157S70" manufactured by Yuka Shell Epoxy Kabushiki Kaisha) were added, and the mixture was stirred for two hours at 50° C. to obtain a composition in the form of a homogeneous solution. The solid content of the composition was determined in the same manner as in Example 1, to find that the solid content was 40%.

Example 8

A composition for Example 8 was prepared in the same manner as in Example 7 except for using the components shown in Table 2.

TABLE 1

|  | Example | | | | | | Comparative |
|---|---|---|---|---|---|---|---|
|  | 1 | 2 | 3 | 4 | 5 | 6 | Example 1 |
| Dispersion liquid of reactive particles | a | b | c | d | e | f | g |
| Oxide particle sol (a) | | | | | | | |
| a1 | 94.0 | 91.3 | — | — | — | — | 95.6 |
| a2 | — | — | 94.4 | — | — | — | — |
| a3 | — | — | — | 97.0 | 97.4 | 96.2 | — |
| Organic compound (b1) | | | | | | | |
| b1-1 | 4.4 | — | 4.8 | 2.2 | 2.2 | 2.2 | 4.4 |
| b1-2 | — | 8.3 | — | — | — | — | — |
| Organic compound (b2) | | | | | | | |
| b2-1 | 1.6 | — | 0.8 | 0.8 | — | — | — |
| b2-2 | — | 0.4 | — | — | 0.4 | — | — |
| b2-3 | — | — | — | — | — | 1.6 | — |
| Ion exchanged water | 0.4 | 0.8 | 0.2 | 0.2 | 0.2 | 0.8 | 0.2 |
| Methyl ethyl ketone | — | — | — | 31.5 | 32.0 | 31.2 | — |
| Methyl ortho-formate | 2.8 | 4.9 | 1.7 | 1.4 | 1.4 | 3.0 | 1.0 |
| p-Methoxyphenol | 0.01 | 0.01 | 0.01 | 0.01 | 0.01 | 0.01 | 0.01 |
| Solid content (%) | 33 | 34 | 19 | 24 | 24 | 24 | 33 |
| Percentage of oxide particles in solid components (%) | 82 | 76 | 72 | 91 | 92 | 88 | 87 |

In Table 1, a1, a2, and a3 indicate the amounts of oxide particles sols (parts by weight) including solvents.
Abbreviations in Table 1 have the following meanings.
a1: Methyl ethyl ketone silica sol (silica concentration: 30%)
a2: Isopropanol alumina sol (alumina concentration: 15%)
a3: Toluene zirconia sol (zirconia concentration: 30%)
b1-1: Organic compound synthesized in Synthetic Example 1
b1-2: Organic compound synthesized in Synthetic Example 2
b2: 2-[(3-methyloxetan-3-yl)-methyloxypropyl]ethoxysilane
b2-2: β-(3,4-epoxycyclohexyl)ethyltrimethoxysilane
b2-3: γ-glycidoxypropyltrimethoxysilane

Examples for the Preparation of Compositions

Examples for the preparation of the composition of the present invention are shown in Examples 7–14 and Comparative Examples 2–3. The weight ratio of the components for the compositions are shown in Tables 2 and 3.

Preparation of dispersion liquids a* to g* has been described in Examples 1–6 and comp. Experiment 1 respectively (see also table 1 second row).

Example 7

145 parts of Dispersion Liquid a prepared in Example 1 (the reactive particles: 48 parts, dispersion medium: methyl ethyl ketone (MEK)), 20.5 parts of dipentaerythritol hexacrylate, and 20.5 parts of pentaerythritol triacrylate were mixed. The mixture was concentrated using a rotary evaporator under reduced pressure to a volume of 120 parts. 122 parts of methyl isobutyl ketone (MIBK), 2.7 parts of 1-hydroxycyclohexyl phenyl ketone, and 1.3 parts of 2-methyl-1-(4-(methylthio)phenyl)-2-

Example 9

A mixture of 176 parts of Dispersion Liquid a prepared in Example 2 (reactive particles: 60 parts, dispersion medium: methyl ethyl ketone (MEK)), 20.0 parts of dipentaerythritol hexacrylate, and 9.0 parts of pentaerythritol triacrylate were mixed, 2.7 parts of 1-hydroxycyclohexyl phenyl ketone, 1.3 parts of 2-methyl-1-(4-(methylthio)phenyl-2-morpholinopropanon-1, 3.0 parts of bis(4-(diphenylsulfonio)phenyl)sulfide bishexafluoroantimonate, and 4.0 parts of bisphenol A novolak epoxy resin ("Epicoat 157S70" manufactured by Yuka Shell Epoxy Kabushiki Kaisha) was stirred for two hours at 50° C. to obtain a composition in the form of a homogeneous solution. The solid content of the composition was determined in the same manner as in Example 1, to find that the solid content was 46%.

Examples 10–14

Compositions for Examples 10–14 were prepared in the same manner as in Example 9 except for using the components shown in Table 2.

Comparative Example 2

A composition for Comparative Example 2 was prepared in the same manner as in Example 7 except for using the components shown in Table 2.

Comparative Example 3

Compositions of Comparative Example 3 was prepared in the same manner as in Example 9 except for using the components shown in Table 2.

Evaluation of Cured Products

To demonstrate the effects of the composition of the present invention, the cured products were prepared by coating the compositions obtained in Examples 7–14 and Comparative Examples 2–3 on substrates, followed by drying and irradiation of the coatings. The cured products were evaluated according to the following methods. The results of the evaluation are shown in Table 2.

1. Coating, Drying, and Curing Conditions

The compositions were applied to substrates using a bar coater so as to produce dry films with a thickness of 10 $\mu$m, dried in a hot oven at 80° C. for 3 minutes, irradiated at a dose of 1 J/cm$^2$ using a conveyer-type mercury lamp, and stored at 25° C. for 24 hours before the evaluation.

2. Substrates

Glass plates were used for the pencil hardness test; polyethylene terephthalate (PET) films with a thickness of 188 $\mu$m were used for the steel wool scratch resistance test, adhesion evaluation test, and chemicals resistance test; and PET films with a thickness of 100 $\mu$m were used for the evaluation of curling properties.

3. Evaluation Method

* Pencil Hardness:

Cured coatings on the glass substrates were evaluated according to JIS K5400.

* Adhesion (%):

The number of remaining 1 mm×1 mm squares among 100 squares in the cellophane tape cross-cut peeling test according to JIS K5400 was counted and the percentage was determined to evaluate the adhesion.

* Steel Wool (SW) Scratch Resistance:

The Gakushin-type abrasion tester manufactured by Tester Industry Co., Ltd. was reciprocated 30 times using #0000 steel wool with a load of 500 g to evaluated scratch conditions of the coating film surface by naked eye observation. The case where no scratch was found was rated as AAA, where there were 1–10 scratches was rated as BBB, and where more than 10 scratches was found was rated as CCC.

* Curling Property Test:

A coating was prepared on a PET film with a thickness of 100 $\mu$m using the composition of the present invention, immediately followed by cutting of 10 cm×10 cm strips with a cutter knife. The strips were left at 25° C. and RH 50% for 24 hours to measure the warping mean value (mm) from the four corners. The warping mean value is determined by putting the warped strip on a plain table, with the corners of the strip above the table. The distance between the four corners of the strip and the table is measured. A mean value of the distance is calculated giving the warping mean value (mm).

* Chemicals Resistance Test:

A coating was prepared on a PET film with a thickness of 188 $\mu$m using the composition of the present invention, immediately followed by cutting to prepare 7 cm×2 cm strips with a cutter knife. About one half of the length of the strips was dipped in ethanol, 10% sulfuric acid aqueous solution, or 1.5 N sodium hydroxide aqueous solution. After dipping for 24 hours at 23° C., the strips were washed with water and dried to observe the change in outward appearance. The sample was rated as AAA in the case where there were no change in outward appearance, and CCC when there were some abnormalities such as loss of transparency, peeling, or stripes.

TABLE 2

| | Example | | | | | | | | Comparative Example | |
|---|---|---|---|---|---|---|---|---|---|---|
| | 7 | 8 | 9 | 10 | 11 | 12 | 13 | 14 | 2 | 3 |
| Reactive Particles (A) | | | | | | | | | | |
| Dispersion Liquid a* | 48 | 48 | — | — | — | — | — | — | — | — |
| Dispersion Liquid b* | — | — | 60 | — | — | — | — | — | — | — |
| Dispersion Liquid c* | — | — | — | 53 | — | — | — | — | — | — |
| Dispersion Liquid d* | — | — | — | — | 74.7 | 74.7 | — | — | — | — |
| Dispersion Liquid e* | — | — | — | — | — | — | 68.5 | — | — | — |
| Dispersion Liquid f* | — | — | — | — | — | — | — | 68.5 | — | — |
| Dispersion Liquid g* | — | — | — | — | — | — | — | — | 53 | — |
| Oxide particles a1 | — | — | — | — | — | — | — | — | — | 53 |
| Radically polymerizable compound (B1) | | | | | | | | | | |
| B1-1 | 20.5 | 22.0 | 20.0 | 20.0 | 17.4 | 16.0 | 22.0 | 22.0 | 22.6 | 22.6 |
| B1-2 | 20.5 | 22.0 | 9.0 | 17.0 | — | — | — | — | 22.6 | 22.6 |
| Cationically polymerizable compound (B2) | 4.0 | 4.0 | 4.0 | 7.0 | 4.0 | 4.0 | 4.5 | 4.5 | — | — |
| B2-1 | | | | | | | | | | |
| Radical polymerization initiator (C1) | | | | | | | | | | |
| C1-1 | 2.7 | 2.7 | 2.7 | 1.6 | 2.6 | 2.6 | 2.0 | 2.0 | 0.9 | 0.9 |
| C1-2 | 1.3 | 1.3 | 1.3 | — | 1.3 | 1.3 | — | — | 0.9 | 0.9 |
| C1-3 | — | — | — | — | — | — | — | — | — | — |
| Cationic polymerization initiator (C2) | 3.0 | — | 3.0 | 1.4 | — | 1.4 | 3.0 | 3.0 | — | — |
| C2-1 | | | | | | | | | | |

TABLE 2-continued

|  | Example | | | | | | | | Comparative Example | |
| --- | --- | --- | --- | --- | --- | --- | --- | --- | --- | --- |
|  | 7 | 8 | 9 | 10 | 11 | 12 | 13 | 14 | 2 | 3 |
| Organic solvent | | | | | | | | | | |
| MEK | 31 | 31 | 116 | — | 75 | 75 | 69 | 69 | 31 | 31 |
| Toluene | — | — | — | — | 162 | 162 | 148 | 148 | — | — |
| MIBK | 122 | 122 | — | — | — | — | — | — | 122 | 122 |
| Isopropanol | — | — | — | 226 | — | — | — | — | — | — |
| Total | 253.0 | 253.0 | 216.0 | 326.0 | 337.0 | 337.0 | 317.0 | 317.0 | 253.0 | 253.0 |
| Nonvolatile components (%) | 40 | 40 | 46 | 31 | 30 | 30 | 32 | 32 | 40 | 40 |
| Properties of cured material | | | | | | | | | | |
| Pencil hardness | 8 H | 8 H | 8 H | 8 H | 8 H | 8 H | 8 H | 8 H | 8 H | 7 H |
| Adhesion (%) | 100 | 100 | 100 | 100 | 100 | 100 | 100 | 100 | 100 | 100 |
| SW scratch resistance | AAA | AAA | AAA | AAA | AAA | AAA | AAA | AAA | AAA | CCC |
| Curling property | 15 | 15 | 15 | 15 | 12 | 12 | 15 | 15 | 40 | 10 |
| Chemicals resistance | | | | | | | | | | |
| Ethanol | AAA | AAA | AAA | AAA | AAA | AAA | AAA | AAA | AAA | AAA |
| 10% $H_2SO_4$ solution | AAA | AAA | AAA | AAA | AAA | AAA | AAA | AAA | AAA | AAA |
| 1.5 N NaOH solution | AAA | AAA | AAA | AAA | AAA | AAA | AAA | AAA | CCC | CCC |

Dispersion Liquid a* to Dispersion Liquid g* in the column of Reactive Particles (A) in Table 2 indicate the amount of solid components (parts by weight) of Dispersion Liquid a to Dispersion Liquid g, respectively.
The results of evaluation are shown in Table 2.
B1-1: Dipentaerythritol hexacrylate
B1-2: Pentaerythritol triacrylate
B2-1: Bisphenol A novolak epoxy resin ("Epicoat 157S70" manufactured by Yuka Shell Epoxy Kabushiki Kaisha).
C1-1: 1-Hydroxycyclohexyl phenyl ketone
C1-2: 2-Methyl-1-[4-(methylthio)phenyl]-2-morpholinopropanone-1
C1-3: Oligo(2-hydroxy-2-methyl-1-(4-(1-methylvinyl)phenyl)propanone)
C2-1: Bis-(4-(diphenylsulfonio)phenyl)sulfide bishexafluoroantimonate Effect of the Invention As described above, the present invention provides reactive particles used for a curable composition exhibiting excellent cured product productivity and capable of forming coatings with high hardness, superior scratch resistance, excellent abrasion resistance, low curling properties, superb adhesion, and chemicals resistance, particularly high chemicals resistance, on the surface of various substrates; a curable composition containing the reactive particles; and cured products made from the curable composition.

What is claimed is:

1. Reactive particles prepared by bonding:
   (a) particles comprising at least one oxide of an element selected from the group consisting of silicon, aluminum, zirconium, titanium, zinc, germanium, indium, tin, antimony, and cerium,
   (b) a first organic compound (b1) having a radically polymerizable unsaturated group and a hydrolyzable group in the molecule, and a second organic compound (b2) containing cationally polymerizable group and a hydrolyzable group in the molecule.

2. The reactive particles according to claim 1, wherein the cationally polymerizable group of organic compound b(2) is select from a group selected from the group consisting of an oxetane group, 3,4-epoxycyclohexyl group, and epoxy group.

3. The reactive particles according to claim 1, wherein the first organic compound (b1) and/or the second organic compound (b2) is a compound having a silanol group or a compound which forms a silanol group by hydrolysis.

4. The reactive particles according to claim 1, wherein the first organic compound (b1) includes a group represented by [—O—C(=O)—NH—] and at least one of the groups represented by [—O—C(=S)—NH—] or [—S—C(=O)—NH—].

5. The reactive particles according to claim 1, wherein the second organic compound (b2) is at least one compound selected from the compounds shown by the following formulas (1), (2), (3) or (4):

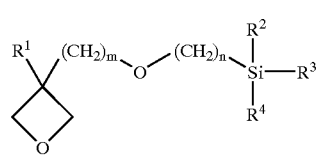
(1)

wherein $R^1$ is a hydrogen atom, alkyl group having from 1–10 C-atoms, fluorine atom, fluoroalkyl group, allyl group, aryl group having 6–20 C-atoms, furyl group, or ethynyl group, $R^2$, $R^3$, and $R^4$ are individually a hydrolyzable group, and m and n are individually an integer from 1 to 10;

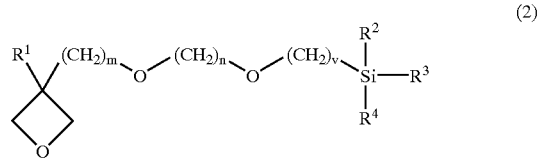
(2)

wherein $R^1$, $R^2$, $R^3$, and $R^4$, m, and n have the same meanings as defined for the formula (1) and v is an integer from 1 to 10;

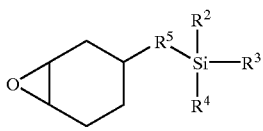

(3)

wherein $R^2$, $R^3$, and $R^4$ have the same meanings as defined for the formula (1) and $R^5$ is a divalent organic group, having from 1 to 20 C-atoms;

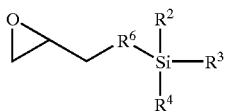

(4)

wherein $R^2$, $R^3$, and $R^4$ have the same meanings as defined for the formula (1) and $R^6$ is a divalent organic group, having from 1 to 20 C-atoms.

6. The reactive particles of claim 5, wherein said first organic compound (b1) is represented by the following formula (6):

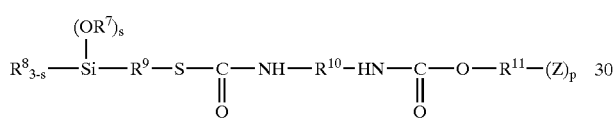

(6)

wherein $R^7$ and $R^8$ individually represent a hydrogen atom, or an alkyl group having 1–8 carbon atoms, or an aryl group having 6–12 C-atoms;

$R^9$ is a divalent organic group having between 1 and 12 C atoms and has an aliphatic structure or an aromatic structure;

$R^{10}$ is a divalent organic group having a molecular weight from 14 to 10,000;

$R^{11}$ is an organic group of a (p+1) valence;

Z is a monovalent organic group having a polymerizable unsaturated group in the molecule which causes an inter-molecular cross-linking reaction in the presence of reactive radicals;

p is an integer from 1 to 20; and s is an integer from 1–3.

7. The reactive particles according to claim 1, containing 0.1 to 60 wt % of the component (b) for 100 wt % of the total of the component (a) and component (b).

8. The reactive particles of claim 1, wherein said first organic compound (b1) is represented by the following formula (6):

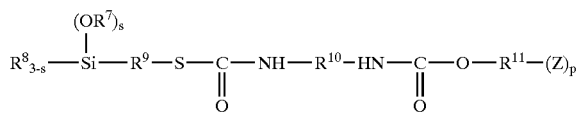

(6)

wherein $R^7$ and $R^8$ individually represent a hydrogen atom, or an alkyl group having 1–8 carbon atoms, or an aryl group having 6–12 C-atoms;

$R^9$ is a divalent organic group having between 1 and 12 C atoms and has an aliphatic structure or an aromatic structure;

$R^{10}$ is a divalent organic group having a molecular weight from 14 to 10,000;

$R^{11}$ is an organic group of a (p+1) valence;

Z is a monovalent organic group having a polymerizable unsaturated group in the molecule which causes an inter-molecular cross-linking reaction in the presence of reactive radicals;

p is an integer from 1 to 20; and s is an integer from 1–3.

9. The reactive particles of claim 1, wherein the ratio of first organic compound b(1) to second organic compound b(2) is in the range of 96:4 to 15:85.

10. The reactive particles of claim 1, wherein said particles comprising at least one oxide have a specific surface area in the range of 100 to 500 $m^2/g$.

11. The reactive particles of claim 1, wherein said particles comprising at least one oxide have a globular shape.

12. A curable composition comprising
(A) the reactive particles described in claim 1, and
(B) a compound having two or more polymerizable groups in the molecule.

13. The curable composition according to claim 12, wherein the compound (B) having two or more polymerizable groups in the molecule comprises a radically polymerizable compound having two or more radically polymerizable unsaturated groups in the molecule (B1) and a cationically polymerizable compound having two or more cationically polymerizable groups in the molecule (B2).

14. The curable composition according to claim 12, further comprising a polymerization initiator (C) in addition to the reactive particles (A) and the compound (B) having two or more polymerizable groups in the molecule.

15. The composition of claim 12, wherein said composition, after cure, is resistant to ethanol, a 10% $H_2SO_4$ solution, and a 1.5N NaOH solution.

16. The composition of claim 12, wherein said composition, after cure, has a pencil hardness of 8H.

17. The composition of claim 12, wherein said composition comprises, relative to the total weight of reactive components in the composition, 30–90 wt % of said compound (B).

18. The composition of claim 17, wherein said composition comprises, relative to the total weight of reactive components in the composition, 10–70 wt % of said reactive particles.

19. The composition of claim 12, wherein said composition comprises, relative to the total weight of reactive components in the composition, 10–70 wt % of said reactive particles.

20. A cured product produced by curing the curable composition according to claim 12.

* * * * *